United States Patent Office 3,333,932
Patented Aug. 1, 1967

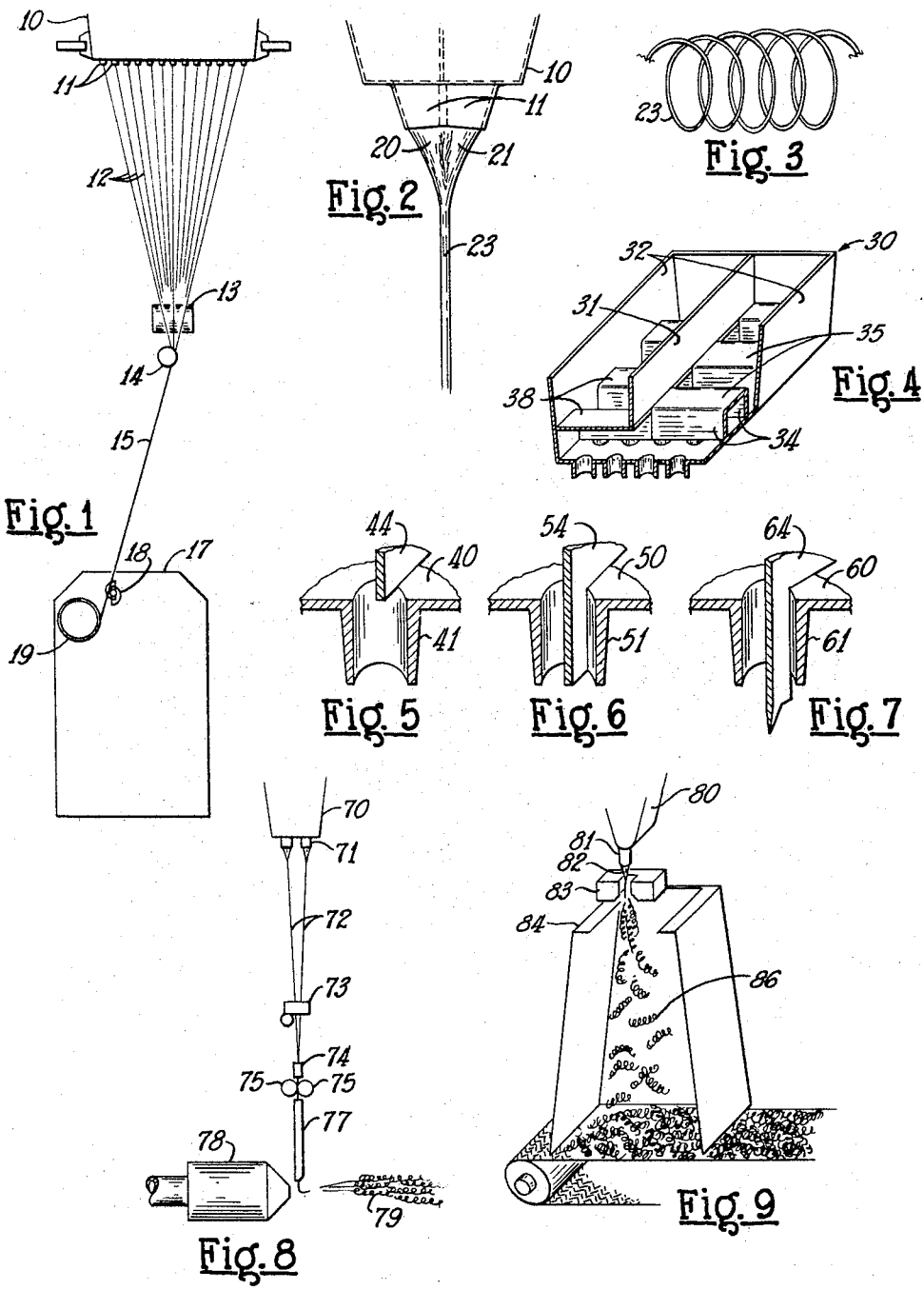

3,333,932
APPARATUS FOR MAKING COMPOSITE FIBERS
Ralph L. Tiede, Newark, Ohio, assignor to Owens-Corning Fiberglas Corporation, a corporation of Delaware
Application June 22, 1962, Ser. No. 204,582, now Patent No. 3,259,479, dated July 5, 1966, which is a division of application Ser. No. 705,863, Dec. 30, 1957, now Patent No. 3,073,005, dated Jan. 15, 1963. Divided and this application Mar. 21, 1966, Ser. No. 536,038
8 Claims. (Cl. 65—1)

This application is a division of my earlier copending application, Ser. No. 204,582, filed June 22, 1962, now issued as Patent No. 3,259,479, dated July 5, 1966, which was a division of my earlier application, Ser. No. 705,863, filed Dec. 30, 1957, now issued as Patent No. 3,073,005, dated Jan. 15, 1963.

This invention is related to composite curly fibers, and more particularly to a method and means for producing curled glass fibers formed of a composite of more than one glass.

Synthetic fibers, such as glass fibers or synthetic resin fibers, are usually smooth surfaced and straight with limited tendencies toward interadherence or establishment of interclinging relationships of themselves, but instead of being more slidably related en masse than interlocking. Glass fibers in particular are of this character, but in addition, such fibers have limited extensibility which in some instances is of itself a limitation preventing their adaptability for specific application. The properties of curliness in synthetic fibers overcomes these limitations and makes the fibers adaptable for many applications where they would otherwise be barred from use.

Methods for forming continuous or discontinuous curly glass fibers have been developed in the past, but in each such known method, some type of after-treatment is required following formation of the fibers to impart the properties of curliness desired. Glass fibers are known to have weakness to abrasion, and accordingly, the method of imparting the curliness is desirably such that it be accomplished without physical handling, such as in an after-treatment. After-treatment usually entails physical action on the fiber such as a mechanical crimping or curl setting of the fibers while hot when the surfaces are especially subject to damage due to abrasion. Such action requires special handling and almost invariably reduces the maximum attainable strength of the fiber.

In view of the foregoing it is a principal object of the present invention to provide a method and means for producing inherently curly glass fibers.

It is another object of the present invention to provide a method and means for producing curly glass fibers utilizing conventional means for attenuation and without the requirement for special handling of the glass fibers to produce the curl.

It is still another object of this invention to provide as economical method and means for producing inherently curly glass fibers capable of high forming speeds without need for subsequent handling to provide the curl.

In brief, these objectives are obtained in the present invention by combining into individual fibers, glasses having different coefficients of expansion brought into intimate side-by-side contacting relationship in the fiber forming region in such a way that there is very little diffusion and they are capable of being attenuated into a single fine fiber with each glass lending its individuality in properties to such fiber. As the fiber so produced cools to room temperature the differences in coefficients of expansion of the composite established forces due to contraction, which in the absence of restraint cause the fibers to curl. The radius of curl is dependent upon the relative magnitude of the coefficients of expansion of the different glasses and upon the diameter of the resulting fiber. Thin bi-glass fibers usually curl more tightly than thick composite fibers of the same glasses.

The property of curliness in glass fibers permits a reduction in mass density requirements for many uses while still providing structural stability, as well as increased resiliency and compression recovery for such products. In considering more specific aspects of use of such fibers, it has been found that curled glass fibers in continuous staple yarns or rovings lend tenacity to the products by causing them to cling to each other more tightly. Curled glass fibers also provide stretchability or yield to textiles, permitting their processing in textile operations such as carding. Light density stretchable bulky masses such as are formed with curly glass fibers further have use for applications such as cable fillers. Curly fibers further improve the recovery and resilience characteristics of mats, batts, cushion materials, flotation products, etc. As fillers for resin products, e.g. woven or nonwoven thin sections or sheets, the curly fibers add strength and also have the property of stretch conformability such as around corners.

In general, curly glass fibers are capable of acting as fillers for standard products of all kinds to maintain thickness and resiliency. As a base for filters, curly fibers improve the dust retention and dust holding capacity as well as the resistance to high velocity fluid flow therethrough. For bonded mats and surface coatings, curly fibers add decorative properties. Furthermore, they allow development of highly resilient mats drainable of moisture without destroying the thermal insulation or mechanical strength properties of a pack. Continuous curly fibers are also extremely valuable for the weaving of cloth since the curl imparts or lends stretchability to the fabric, whereas the non-curled fibers in a similar fabric result in non-stretchability and corresponding non-conformability of the fabric to desired contours, such as for upholstery or linings, such as the roof linings of automobiles.

A feature of the invention lies in the fact that the fibers produced incorporate the desirable properties of straight fibers of the material from which they are made but additionally have an inherent curliness.

A further feature of the invention lies in the adaptability of the invention to production of extremely fine curly fibers with conventional fiber attenuating means already well established in the art.

A still further feature of the invention lies in the lack of need for special treatment of the fibers subsequent to formation to impart the desired curliness thereto.

Another and still further feature of the invention lies in the fact that the surface forces of molten material utilized to produce conventional fibers lend themselves to establishment of an integral relationship between the compatible materials used to make up the curled fibers.

These and other objects and features of the present invention will become more apparent from the following description taken in conjunction with the accompanying drawing in which:

FIGURE 1 is a somewhat schematic elevational view of glass fiber strand-forming apparatus whereby continuous curly textile strand products are produced.

FIGURE 2 is an enlarged view of the feeder tip arrangement whereby a feeder in the apparatus of FIGURE 1 is capable of producing a curly fiber of a composite of two glasses.

FIGURE 3 is an illustration of the type of continuous curly fiber produced according to the present invention as it appears in its natural unrestrained form.

FIGURE 4 is a broken away isometric view of a portion of a feeder or bushing constructed to produce fibers according to the present invention.

FIGURE 5 is a cross-sectional isometric view of a feeder tip from which fibers can be attenuated according to the principles of this invention.

FIGURE 6 is a cross-sectional isometric view of another feeder tip construction for producing fibers according to this invention.

FIGURE 7 is a cross-sectional isometric view of still another feeder tip construction for producing fibers according to this invention.

FIGURE 8 illustrates an arrangement for producing discontinuous long, fine, composite fibers according to the principles of this invention.

FIGURE 9 is a somewhat schematic elevational view of another process for producing discontinuous composite fibers according to this invention wherein steam or air blasts are utilized to attenuate the fibers from the feeder.

Although the invention as herein described is exemplified by relation to glass-fiber forming operations, it will be understood that composite curly fibers of materials other than glass can also be made according to the principles of this invention. By way of example, fibers of different resins or different refractory materials can be formed according to these principles, as well as metallic fibers or fibers of different materials such as glass and metal, for example glass and aluminum, glass and zinc, glass and lead, or glass and alloys of such metals.

Referring to the drawings in greater detail, FIGURE 1 illustrates a strand forming operation in which glass fibers 12 are attenuated from orificed tips 11 of a feeder 10 containing and supplying two separate glasses as hereinafter described in greater detail. After attenuation, the fibers 12 are drawn over a roll-type size applicator 13 for receipt of a coat of sizing material prior to the fibers being drawn together over a gathering wheel 14 at which the fibers are formed into a strand 15. The strand 15 is wound by a winder 17 into a package on a rotating collet 19 and is traversed into the package by a suitable traverse such as a spiral-wire type traversing device 18. The fibers are wound into the package under tension, and thus, even though being inherently of a curly character, the curl of the fibers does not evidence itself until the strand is released from its taut or tensioned condition in the package.

FIGURE 2 is an enlarged view of a tip section associated with the feeder 10 showing the form and disposition of a mated or double tip 11 from which two glasses 20 and 21 emerge from two orifices into a common forming cone which is attenuated into a bi-glass fiber 23. The molten streams are kept separate until joined in the fiber forming cone from which the fiber is attenuated. The molten streams merge upon emerging from the tip 11, whereupon the surface tension of the common stream thus formed acts to constrict the flowing mass into the common stream causing it to neck down, aided by the forces of attenuation exerted by way of the fiber 23. The combination of the surface tension forces of the composite stream and the cooling action of the glass upon introduction into the atmosphere co-act so that the resulting fiber is a true circular form with the two glasses aligned in side-by-side relation on both sides of a central dividing line.

An interesting property which has been noted in some such fibers is that they will curl to different degrees with changes of temperature which for some applications will lend an inherent advantage to the product produced therefrom.

Beside selection of the glasses for their differences in coefficients of expansion to impart the desired curl to the bi-glass fiber, they are also selected for compatibility with each other and adaptability to wetting each other prior to, or during neck-down in the forming zone. A factor determining compatibility of the two glasses is tendency of the paired glasses not to intermix or diffuse before solidification and as attenuation occurs. Fully intermixed or diffused masses will not provide characteristics of curl. Further in this respect, it is known that some glasses when intermixed have a higher devitrification point than either of the original glasses, and that attempts to form a biglass combination thereof must be done in such a manner that attenuation takes place as soon as possible after contact of the glasses with each other so that intermixture and devitrification does not have an opportunity to occur. Another factor is the relative viscosity characteristics of the two glasses in that they should both be flowable and attenuable in a common range for forming fibers.

FIGURE 3 illustrates the helical form of a single fiber produced by combining a pair of glasses in side-by-side relationship to produce a curled bi-glass fiber or filament. The shape illustrated corresponds to that acquired by a free bi-glass fiber when released from a taut condition such as on a package. A free strand of such curly fibers acquires a corresponding curled condition.

Although the tip section arrangement of FIGURE 2 is capable of being formed of a pair of feeders, each having a separate glass or a common feeder with two glasses partitioned off from each other within the main body of the feeder, difficulty arises when attempts are made to provide more than a single row of tips in such a feeder arrangement. FIGURE 4 illustrates a feeder 30 in which two glasses are partitioned from each other by a divider 31 extending generally through the longitudinal center of the feeder. Electrical terminals are provided at opposite ends of the length of the feeder in conventional manner and electrical current is passed therethrough to heat the molten masses contained in the feeder, but the lower portion of the feeder is baffled, or in a sense bridged width-wise so that each glass extending through the length-wise half has access to the full width of the feeder in alternate zones along the length of the feeder. The baffling is provided by a series of cross-wave partitions 34 spaced from each other the distance equal to the space along the length of the feeder between crosswise rows of orifices. The partitions 34 extend across the full width of the feeder interior between the longitudinal exterior walls 32 and each is arranged to bisect a row of tip channels or orifices in the tip section of the feeder.

The partition 31 extends from the upper portion of the feeder down to the top of the cross-wise partitions 34. Overhanging flow blocking portions or bridges 35 extend from the front side wall 32 in FIGURE 4 between alternate adjacent pairs of the baffles 34, while overhanging bridge portions 38 are provided next to the back side wall 32 in FIGURE 4 between the alternate adjacent pairs of baffles 34 not bridged by the bridging portions 35. Such construction maintains the two glasses separated on opposite sides of the partition 31, but with access to each row of tips, since the alternate zones in the tip section each provide a path of emergence for its respective glass through two adjacent rows of half orifices in the bisected tips. The tips thus each provide abutting paths of flow for the two glasses in the feeder and as many longitudinal rows of orifices distributed across the width of the feeder may be formed as are desired.

The feeder is replenished with the two separate fiber forming materials by introduction of marbles or other solid forms of the two materials in their respective separate compartments within the feeder, wherein they may be maintained at desired levels by suitable level controls. Alternately, molten forms of each of the materials can be introduced into the feeders from separate melting sources, and the materials in each compartment can be maintained and regulated by suitable associated electrical controls.

FIGURE 5 is a cross-sectional view of a partitioned tip 41 projecting from the bottom 40 of the feeder for producing bi-glass fibers such as in the bushing or feeder arrangement of FIGURE 4. In this arrangement, the cylindrical tip 41 is bisected at its upper end on the interior of the feeder by a wall 44 which extends across the opening to the tip. The different glasses forming a bi-glass fiber flow from both sides of the partitioning wall 44 to be combined within the zone extending for the length of the tip prior to emergence from the bottom thereof for attenuation into a common fiber. Under some circumstances the partitioning wall may be desirably extended part way into the opening in the tip.

FIGURE 6 illustrates another tip arrangement by which bi-glass fibers have been made wherein the cylindrical tip 51 projecting from a feeder bottom 50 is completely bisected for its full length by a partitioning wall 54. The two glasses flowing into the tip opening do not make contact with each other until they emerge from the bottom of the tip 51. The channels formed by the partitioning wall 54 thus formed as illustrated is preferably semi-circular, but two circular openings in side-by-side relationship will also permit accommodation of streams emitted therefrom into a common stream. Further in this respect, it will be understood that the channels need not be in a common tip, but may be formed in two separate tips having their outlets in sufficiently close proximity that the glasses emitted will join to form a common forming cone.

FIGURE 7 shows another tip arrangement which has been used successfully to produce bi-glass fibers wherein the partitioning wall 64 extends completely through the length of the tip and slightly beyond. The partitioning wall thus forms two half cylindrical paths for the two glasses and channels the glasses from opposite sides of the wall 64 into the common glass stream below the projected portion extending below the bottom of the tip 61, extending from the bottom 60 of the feeder. The bottom of the projection can be shaped to conform to the heat distribution pattern within the cone, thereby preventing premature joinder of glasses having tendencies toward diffusion. In the three arrangements of FIGURES 5 to 7 the partitioning walls are made of high temperature resistance material such as platinum, but are not limited to being metal, and under many circumstances they may be of other materials such as ceramic partitioning walls. The selection of any one of the three tip arrangements is dependent upon the glasses to be combined into the common stream for attenuation into fibers. Where the compatibility of the glasses for formation of bi-glass fibers is such that diffusion or devitrification would readily take place upon contact, then the arrangement of FIGURE 5 is not desirable and the degree of tendency toward an intermixture would determine whether the arrangements of FIGURES 6 or 7 might be resorted to. Where the glasses do not readily intermix but require a finite time for establishment of a temperature relationship between the two wherein they will form an integral stream, then the arrangement of FIGURE 5 may be found desirable. In any specific instance, however, the arrangement to be resorted to would be dependent upon a study and somewhat upon trial of the characteristics desired before settling on the tip arrangement to be utilized.

It has been found that partitions bisecting the tips through which the glass flows is conductive to establishment of greater stability in the fiber forming cone with consequent assurance of a more continuous interruption free operation in the formation of fibers. This characteristic operation occurs by reason of the fact that the stream is first divided prior to combination, thereby assuring that any incongruities or extraneous materials existing in the flowing masses combined into the fiber forming cone do not extend completely through the whole cross section of the fiber forming cone, and in turn assuring the likelihood that at least part of the cross section of the flowing mass is in condition which will resist breakage of the fiber stream. Conventional operations are at times subject to the requirement of forming fibers of molten masses containing seeds or cords. By forming the fiber forming cone of two separate streams of glass, whether from either two different glasses or from a common mass of glass, the likelihood of the full cross section of the common cone into which they flow containing extraneous matter is minimized, thereby contributing to maintenance of a stable continuous fiber attenuating operation.

Further in this respect, stability in the fiber forming cone is assured by provision of more edges in the zone of the fiber forming cone for molten material to cling to on emergence from the tips 51 and 61 of FIGURES 6 and 7, respectively. In other words, the partitions 54 and 64, in bisecting their respective tip orifices, provide two half circular edges and a central straight edge for the molten material to attach itself upon combination into the forming cone, and the proximity of three such stable edges in the zone where the material is most fluid lends to stability to the cone, especially by reason of one of such stable edges being located centrally in the cone. Difficulties previously experienced in pumping of the molten material in this zone, with consequent dancing or hunting by the forming cone on emergence of the molten mass from the tip is minimized or eliminated. A constant continuous stable forming operation is thus provided which acts to reduce waste due to interruption, and consequently increases the economy of production of fibers whether of bi-glass or of conventional type.

In making conventional fibers according to these principles, that is, a fiber in which the glass flowing from both sides of the partitioning wall are the same, then the wall can be arranged to extend only part way through the bushing, and can be made removable as well, or be merely a series of inserts designed only to bisect the tip orifices for the stability obtainable thereby. Such partitioning structures may extend either lengthwise or width-wise, or both, with the bisecting projections being properly spaced so that the partitioning structure can be merely dropped into place in the orifices of the tips.

Combination of the two streams flowing into contact with each other on passage below the partitioning walls of any one of the three arrangements of FIGURES 5 to 7, the bottom edge of the bisecting wall in the zone where the streams of material come together can be specially contoured, dependent upon the characteristics of the hot flowing matter to facilitate joinder into a common forming cone.

The following are examples of glass compositions which may be paired to produce curly bi-glass fibers or filaments.

The examples set forth are presented solely for the purpose of further disclosing the invention, and are in no way to be construed as limitations thereon. Composition A is a commercially used standard composition for textile fibers, while streams of any of compositions B, C, and D can be combined with composition A to successfully form curly fibers.

COMPOSITIONS

|  | "A" | "B" | "C" | "D" |
|---|---|---|---|---|
| SiO₂ | 54.2 | 65.0 | 64.9 | 72.7 |
| Al₂O₃ | 14.6 | 3.6 | 4.0 | 2.0 |
| CaO | 17.3 | 14.4 |  | 5.6 |
| MgO | 4.6 | 2.7 |  | 3.3 |
| B₂O₃ | 8.4 | 5.5 | 6.0 |  |
| Na₂O | 0.6 | 8.2 | 16.0 | 15.6 |
| K₂O |  |  |  | 0.2 |
| TiO₂ |  |  | 4.0 |  |
| ZrO₂ |  |  | 2.0 |  |
| Fe₂O₃ | .2–.3 | .2–.3 | .14 | .2–.3 |
| Zn |  |  | 3.0 |  |
| Coefficient of Thermal Expansion +10⁻⁷ per °C | 50 | 72 | 80 | 87 |

FIGURES 8 and 9 illustrate other fiber forming processes wherein discontinuous bi-glass curly fibers are producible. In the process and arrangement of FIGURE 8, bi-glass streams are first attenuated to produce primary fibers or fibers of diameter greater than the finally desired diameter. The primaries are then reattenuated by the high energy blast of a combustion blowing burner to produce secondary, finer fibers of bi-glass curly character. As illustrated, a feeder 70 having a pair of rows of partitioned tips 71 supply bi-glass streams which are attenuated into bi-glass primary fibers 72. Attenuation of the streams is effected by forces supplied by co-acting feed rolls 75 which draw the primaries through a roller guide assembly 73 which hold the fibers in separated and supported relationship as a fan 76 prior to passage through a top guide 74 to the feed rolls 75. The feed rolls are driven by motor drive means not illustrated. The primary fibers 72 are then fed in aligned relationship through a bottom guide 77 which supports them and aids in penetration of the ends of the fibers into the combustion blast of the burner 78 to produce long, fine secondary fibers 79 of bi-glass curly character.

FIGURE 9 illustrates another process by which discontinuous fine bi-glass curly fibers can be produced wherein gaseous blasts such as from steam or air blowers act on the bi-glass streams to attenuate them into bi-glass fibers. As illustrated, the feeder 80, having a single row of partitioned tips 81 supplies bi-glass streams 82 which are attenuated by gaseous blasts from a steam or air blower 83 disposed in the region of the fiber forming cones. The energy of the blast acts to disrupt the bi-glass streams and form discontinuous lengths of bi-glass fibers 86 which are then passed through a hood 84 for accumulation or deposition on a conveyor disposed below.

In either of the arrangements of FIGURES 8 and 9, the discontinuous bi-glass curly fibers can be accumulated or deposited on a conveyor to form a mat or other mass product. The curliness of the fibers in this arrangement impart a bulkiness to the mass, thereby reducing the density requirements for desired dimensions in the mass. Additionally, the curliness in providing a springy action provides a better recovery characteristic in the mass and is obtainable with straight fibers in a similar product. Furthermore, the irritability frequently caused by contact with numerous ends of straight fibers is practically eliminated by reason of the individual fibers being more springy and being capable of bending back on themselves in the mass accumulation within which they are incorporated. Discontinuous fibers of this character are especially adaptable to forming staple-type yarns by false or actual twisting and drafting in view of their tendency to cling or interadhere. Such fibers also are of character which can advantageously combine with other fibers such as cotton to produce composite blends in yarns or mass products such as mats or paper. They also are capable of ready processing in weaving operations such as picking and carding. In this respect, a soluble fiber such as a polyvinyl alcohol fiber might be used as a carrier for glass fibers to improve results in picking, carding, drawing, roving, and spinning glass fibers into yarn. The soluble carrier can be dissolved following processing of the yarn, such as after it has been woven into a fabric.

The fibers also have proven of desirable character in the reinforcement of gypsum board and pottery or firing clays in that they provide an unusual property for glass fibers in having what might be termed a mechanical hook or coiling action so that they reinforce in a different manner than straight fibers for such purposes.

It will be understood that variations of the concepts herein presented will be readily discernible by those familiar with the glass fiber art, and that modifications can be made in the structures and processes within the broad concepts of the invention. For example, changes can be made to provide bushings wherein the tipped orifices are divided somewhat eccentrically with a larger flow of one material from one side of the partition so as to incorporate more of one material in a fiber or filament than the other. Correspondingly, films or flakes of two glasses might be formed wherein one side of the form is of one glass, and the other side is another glass to impart a curly or wavy character to the form.

In view of the foregoing, it will be understood that while I have shown certain particular forms of my invention, that I do not wish to be limited thereto since many modifications may be made within the concepts of the invention and I, therefore, contemplate by the appended claims to cover all such modifications which fall within the true spirit and scope of my invention.

I claim:

1. A feeder for producing fibers of heat softened fiber forming material comprising a reservoir for holding such heat softened material, an outlet tube extending from said reservoir, said tube being partitioned by a transverse dividing member extending through its entire length to divide the tube interior into two channels for division of material flowing therethrough into two parallel streams, said partition being sufficiently thin that the streams are in close proximity for subsequent combination into a common stream, said partitioned member extending a distance beyond the interior of said outlet tube to provide a stationary stabilizing structure outside of said outlet tube in a zone where said streams combine into a common stream.

2. A structure for forming a single glass filament of two streams of molten glass flowing from a container comprising a hollow tubular body extending from a surface of said container communicating with the interior of said container, said body having an open lower end, a transverse dividing member extending through said hollow tubular body and partitioning said body throughout its length into two colinear passageways to maintain separated streams of glass emerging from said passageways of said body, said dividing member being sufficiently thin that the streams are in close proximity for subsequent combination into a common stream upon emergence from said passageways for attenuation into a single filament.

3. Feeder apparatus for producing fibers from supplies of molten glass material comprising a container, a plurality of projecting orificed tips each of which depends from and communicates with the interior of said container, means within said container for separating the fiber forming material into two masses, and partition means for each of said projecting tips for maintaining separation of said two masses of fiber forming material until each mass is within said orifice of each of said projecting tips, said partition means substantially transversely bisecting each orifice of each tip allowing substantial stream flow on each side of said partition means, said stream flow from each side of said partition means meeting in side by side relation after passing said partition means to form a common fiber forming cone.

4. Feeder apparatus as defined in claim 3 in which said partition means depends into and transversely bisects each orifice formed in each of said projecting tips.

5. Feeder apparatus as defined in claim 4 in which said partition means depends into each orifice for the full length of said orifice.

6. Feeder apparatus as defined in claim 4 in which said partition means depends into and completely through each orifice, extending beyond the termination of said orifice.

7. Feeder apparatus as defined in claim 4 in which the edge of said partition means which depends into an orifice of said projecting tip is shaped to conform to the heat distribution pattern within the fiber forming cone, thereby preventing premature joinder of fiber forming materials having tendencies toward diffusion.

8. Feeder apparatus as defined in claim 3 in which said container has a bottom wall and upwardly extending walls and in which said projecting tips are arranged in a plurality of rows on the exterior of said bottom wall, said separating means comprising one of said partition means for each row extending between said upward walls over orifices formed in the row of projecting tips, means for dividing the container above said partition means extending between said upward walls transverse to said partition means, first flow blocking bridge means extending from one side of said dividing means between alternate adjacent pairs of partition means, and second flow blocking bridge means extending from the other side of said dividing means between the alternate adjacent pairs of partition means not bridged by said first flow blocking bridge means.

References Cited

UNITED STATES PATENTS 2,900,708    8/1959    Pond.

FOREIGN PATENTS 1,158,476    1/1958    France.

DONALL H. SYLVESTER, *Primary Examiner.*

R. L. LINDSAY, *Assistant Examiner.*